United States Patent
Kashiwada et al.

(10) Patent No.: US 6,937,810 B2
(45) Date of Patent: Aug. 30, 2005

(54) AMPLIFYING OPTICAL FIBER, OPTICAL FIBER AMPLIFIER AND OPTICAL TRANSMISSION SYSTEM

(75) Inventors: Tomonori Kashiwada, Yokohama (JP); Toshimi Suzuki, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/451,844

(22) PCT Filed: Sep. 7, 2001

(86) PCT No.: PCT/JP01/07803
§ 371 (c)(1),
(2), (4) Date: Jun. 26, 2003

(87) PCT Pub. No.: WO02/054545
PCT Pub. Date: Jul. 11, 2002

(65) Prior Publication Data
US 2004/0047584 A1 Mar. 11, 2004

(30) Foreign Application Priority Data
Dec. 27, 2000 (JP) ......................................... 2000-398906

(51) Int. Cl.[7] ................................................. G02B 6/26
(52) U.S. Cl. ........................... 385/142; 385/147; 372/6; 359/341.32
(58) Field of Search ................................. 385/142–145, 385/147; 372/6; 398/1, 9; 359/341.32

(56) References Cited

U.S. PATENT DOCUMENTS 5,027,079 A * 6/1991 Desurvire et al. ...... 359/341.32
6,243,196 B1   6/2001 Endo et al. .................. 345/473

FOREIGN PATENT DOCUMENTS

| EP | 409258 A | 1/1991 |
|---|---|---|
| EP | 0 409 258 | 1/1991 |
| JP | 6-95095 A | 4/1996 |
| JP | 8-95095 | 4/1996 |
| JP | 6-110535 A | 4/1996 |
| JP | 8-110535 | 4/1996 |
| JP | 2669976 | 7/1997 |
| JP | 11-177172 | 7/1999 |

OTHER PUBLICATIONS

C. Randy Giles, "Modeling Erbium–Doped Fiber Amplifiers", Journal of Lightwave Technology, vol. 9, No. 2., FEb. 1991, pp. 271–283.

C.R. Giles et al., "Spectral Dependence of Gain and Noise in Erbium–Doped Fiber Amplifiers", IEEE Photonics Technology Letters, vol. 2, No. 11, Nov. 1990, pp. 797–800.

W. L. Barnes et al., "Absorption and Emission Cross Section of $ER^{3+}$ Doped Silica Fibers", IEEE Journal of Quantum Electronics, vol. 27., No. 4, Apr. 1991, pp. 1004–1010.

"Erbium–Doped Fiber Amplifiers", Principles and Applications, Emmanuel Desurvire, pp. 242–245.

(Continued)

*Primary Examiner*—Phan T. H. Palmer
(74) *Attorney, Agent, or Firm*—McDermott Will & Emery LLP

(57) ABSTRACT

This invention relates to an optical fiber for amplification suitable for amplifying signals in the L-band, an optical fiber amplifier including the optical fiber, and an optical transmission system. The optical fiber amplifier according to the invention includes a silica-based optical fiber as an optical fiber for amplification, which has a core region doped with Er and Al. The optical fiber for amplification has an Er concentration of 1,500 wt.ppm or less, and has the characteristics at a wavelength of 1.53 μm of: an absorption loss of 10 dB/m or more but 25 dB/m or less; and an unsaturated absorption of 900 dB or less.

5 Claims, 6 Drawing Sheets

OTHER PUBLICATIONS

H. Ono et al., "A 1.58 µm BAND ER$^{3+}$–Doped Fiber Amplifier", The Institute of Electronics, Information and Communication Engineers, Proceedings of the IECE General Conference, 1997pp. 270–271 & pp. 1–4 (English Translation).

A. Mori et al., "Gain Flattened Er$^{3+}$–Doped Tellurite Fibre Amplifier for WDM Signals in the 1581–1616nm Wavelength Region", Electronics Letters, Mar. 2000, vol. 36, No. 7, pp. 621–622.

K.P. Hansen et al., "Design Optimisation of Erbium–Doped Fibres for Use in L–Band Amplifiers", Electronics Letters, Sep., 2000, vol. 36, No. 20, pp. 1685–1688.

Mori, A., "Gain flattened Er$^{3+}$–doped tellurite fibre amplifier for WDM signals in the 1581–1616 nm wavelength region", Electronics Letters, Mar., 2000, vol. 36, No. 7, pp. 621–622.

Hansen, K.P. et al., "Design optimisation of erbium–doped fibres for use in L–band amplifiers", Electronics Letters, Sep., 2000, vol. 36, No. 20, pp. 1685–1686.

* cited by examiner

Fig.4

| SAMPLE EDF | Er CONCENTRATION (wt.ppm) | Al CONCENTRATION (wt%) | ABSORPTION LOSS (dB/m) AT 1.53 μm | CUTOFF WAVELENGTH (μm) | LENGTH (m) | UNSATURATED ABSORPTION (dB) | POLARIZATION MODE DISPERSION (ps)AT 1.58 μm |
|---|---|---|---|---|---|---|---|
| EDF-A | 520 | 3.5 | 5.5 | 0.91 | 142 | 780 | 0.61 |
| EDF-B | 780 | 2.0 | 15.6 | 1.46 | 50 | 780 | 0.25 |
| EDF-C | 970 | 3.0 | 18.8 | 1.39 | | | |
| EDF-D | 850 | 3.0 | 16.0 | 1.32 | | | |
| EDF-E | 1080 | 3.5 | 20.0 | 1.31 | | | |

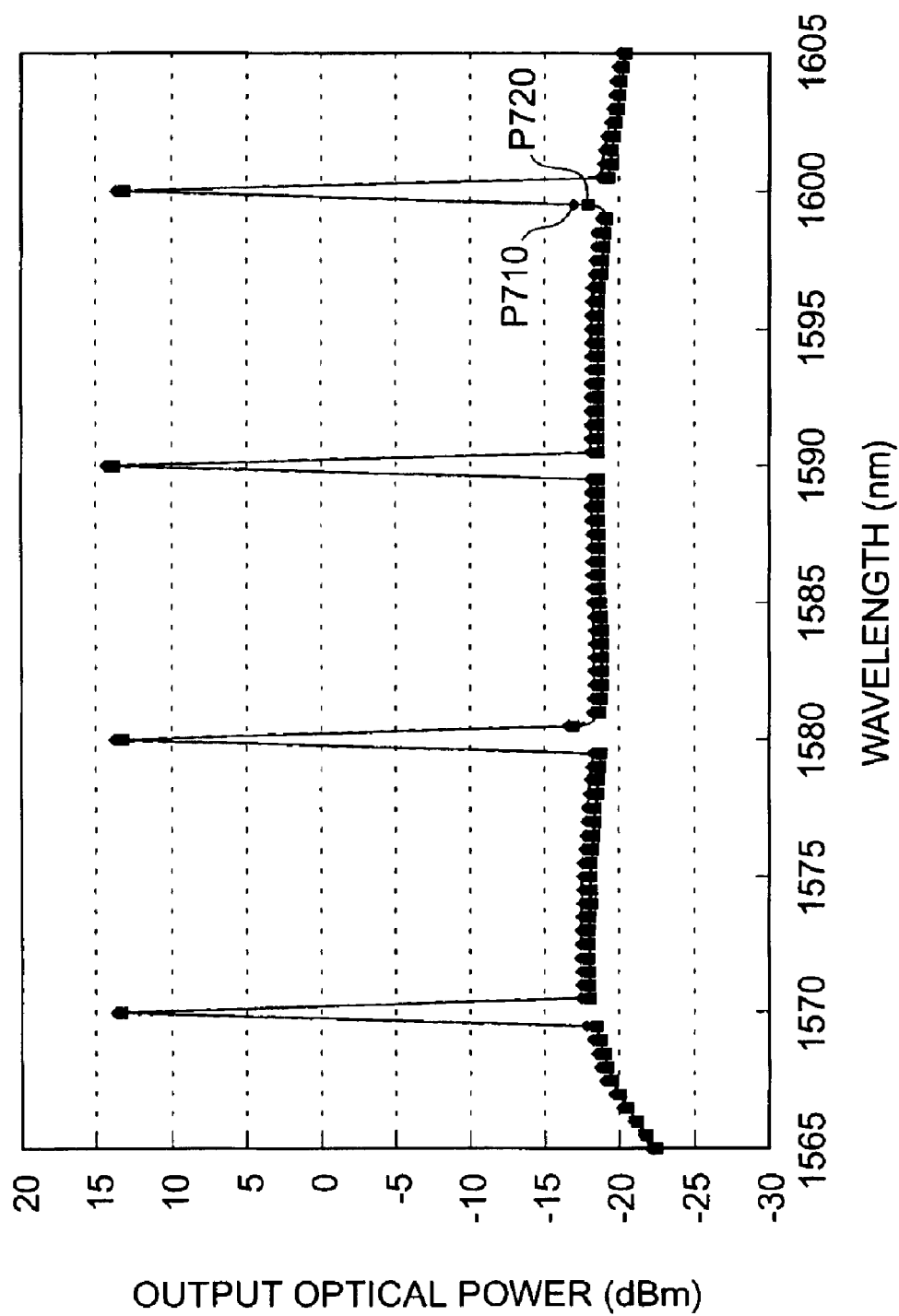

AMPLIFYING OPTICAL FIBER, OPTICAL FIBER AMPLIFIER AND OPTICAL TRANSMISSION SYSTEM

TECHNICAL FIELD

The present invention relates to an optical fiber for amplification having a core region doped with Er, an optical fiber amplifier including the optical fiber for amplification, and an optical transmission system including the optical fiber amplifier.

BACKGROUND ART

An optical transmission system is designed to transmit and receive information by causing signals to propagate along an optical fiber transmission line. Since signals propagating along the optical fiber line attenuate (transmission loss), an optical fiber amplifier for amplifying signals is provided for a repeater to compensate for the loss. Conventionally, the C-band, defined as the wavelength range of 1,530 nm to 1,570 nm, is used as a signal wavelength band in the optical transmission system. As an optical fiber amplifier for amplifying signals in the respective channels in the C-band, an optical fiber amplifier (EDFA: Erbium-Doped Fiber Amplifier) having, as an amplification medium, an optical fiber for amplification (EDF: Erbium-Doped Fiber) with a core region doped with Er is used.

Recently, in order to realize larger-capacity information transmission, studies have been made to use signals in the respective channels in the L-band defined as the wavelength range of 1,570 nm to 1,610 nm in addition to the C-band. An EDFA can also be used as an optical fiber amplifier for amplifying signals in the respective channel sin the L-band. For example, as the first prior art, an Er-doped silica fiber and Er-doped fluoride fiber used as an L-band EDF are disclosed in Ono et al., "1.58-$\mu$m Band $Er^{3+}$-Doped Optical Fiber Amplifier", the 1997 IEICE General Conference, C-3–86 (1977).

DISCLOSURE OF INVENTION

The present inventors have studied the above conventional optical fiber amplifier to find the following problems. An L-band EDF operates under conditions different from those for a C-band EDF, and requires a more total doping amount of Erbium. In other words, the concentration of Erbium itself added in the EDF must be increased or its length must be increased. For example, the silica-based L-band EDF disclosed in the first prior art has an Er concentration of 1,310 wt.ppm and a length of 200 m. The L-band EDFA disclosed in Japanese Patent Laid-open No. 11-177172 (second prior art) has silica-based EDFs connected in multiple stages. Of these EDFs, each of the EDFs at the second and subsequent stages has an unsaturated absorption of 560 dB or less.

Note that the unsaturated absorption of an EDF is given by the product (=absorption loss per unit length at wavelength of 1.53 $\mu$m×length) of an absorption amount per unit length at a wavelength of 1.53 $\mu$m in the loss spectrum (see Japanese Patent No. 2669976) and the length of the EDF.

In the case of bi-directional pumping in which pumping light beams having, for example, a wavelength of 1.48 $\mu$m are supplied to the two ends of an EDF, the power of pumping light supplied to the EDF can be increased up to about 800 mW by increasing the output power of a semiconductor laser source itself used as a pumping light source for outputting pumping light, or by increasing the output power of pumping light by wavelength-multiplexing or polarization-multiplexing light beams output from a plurality of light sources. Accordingly, studies have been made to increase the unsaturated absorption of one EDF to about 900 dB.

In order to increase the unsaturated absorption of the EDF, however, its length must be increased. This makes it difficult to realize miniaturization of conventional L-band EDFAs. In addition, increasing the length of the EDF will pose a problem in terms of a deterioration in waveform due to polarization mode dispersion or a nonlinear optical phenomenon. To increase the unsaturated absorption of the EDF, therefore, it is important to increase absorption loss $\alpha_{1.53}$ at a wavelength of 1.53 $\mu$m. This absorption loss $\alpha_{1.53}$ depends on the Er concentration in the EDF and its structure. As the Er concentration is increased, the absorption loss $\alpha_{1.53}$ can be increased. With this increase, however, the amplification efficiency decreases due to concentration quenching.

The present invention has been made to solve the above problems, and has as its object to provide an optical fiber for amplification having a structure suitable for amplifying signals in the respective channels in the L-band, an optical fiber amplifier including the optical fiber for amplification, and an optical transmission system including the optical fiber amplifier.

An optical fiber for amplification according to the present invention is a silica-based optical fiber having a core region doped with Er and Al (including a case wherein part of the core region is doped with Er element and Al element). The optical fiber for amplification according to the present invention has an Er concentration of 1,500 wt.ppm or less, an absorption loss of 10 dB/m or more but 25 dB/m or less, and an unsaturated absorption of 900 dB or less. An optical fiber amplifier according to the present invention includes an input terminal for receiving signals in the L-band defined as the wavelength range of 1,570 nm to 1,610 nm, the above optical fiber for amplification (the optical fiber for amplification according to the present invention) which amplifies signals in each channel in the L-band, received through the input terminal, when pumping light is supplied, and a pumping light source which supplies pumping light to the optical fiber for amplification. In addition, an optical transmission system according to the present invention includes the above optical fiber amplifier (the optical fiber amplifier according to the present invention) and allows amplification and transmission of signals in the L-band.

With the above arrangement, the length of the optical fiber for amplification can be decreased, and a deterioration in waveform due to polarization mode dispersion or a nonlinear optical phenomenon can be effectively suppressed. According to this optical fiber for amplification, the influence of concentration quenching is reduced, and the amplification efficiency is improved. An optical fiber amplifier having such an optical fiber for amplification can be reduced in size and has an excellent amplification characteristic with respect to signals in the L-band, in particular. In addition, an optical transmission system including such an optical fiber amplifier allows high-speed, large-capacity optical transmission using signals in the L-band.

Note that the optical fiber for amplification according to the present invention preferably has a cutoff frequency of 1.2 $\mu$m or more but 1.5 $\mu$m or less at a length of 2 m. In this case, the absorption loss at a wavelength of 1.53 $\mu$m can be increased without increasing the Er concentration.

The optical fiber for amplification according to the present invention preferably has a polarization mode dispersion of 0.5 ps or less in the L-band. In this case, a deterioration in the waveform of a signal in the L-band can be suppressed, and high-speed optical transmission can be realized.

In addition, the optical fiber for amplification according to the present invention is preferably disposed in the form of a bundle or being wound around a bobbin. This improves the ease of accommodating the optical fiber in an optical fiber amplifier and handling it.

Note that each embodiment of the present invention will become more apparent from the following detailed description and the accompanying drawings. It should be noted that these embodiments are mere examples and do not limit the present invention.

The further application range of the present invention will become obvious from the following detailed description. Although the detailed description and specific cases indicate preferred embodiments of the present invention, they are merely examples. It is obvious that various modifications and improvements within the spirit and scope of the present invention are apparent to those skilled in the art from the detailed description.

BRIEF DESCRIPTION OF DRAWINGS

FIG. 4 is a table providing a summary of specification data of a plurality of types of samples, each corresponding to the optical fiber for amplification according to the present invention, and a comparative example;

FIG. 7 is a graph showing the amplification characteristic of an optical fiber amplifier to which an EDF-A as a comparative example is applied and the amplification characteristic of an optical fiber amplifier to which a sample EDF-B corresponding to the optical fiber for amplification according to the present invention is applied.

BEST MODE FOR CARRYING OUT THE INVENTION

Figure 1:
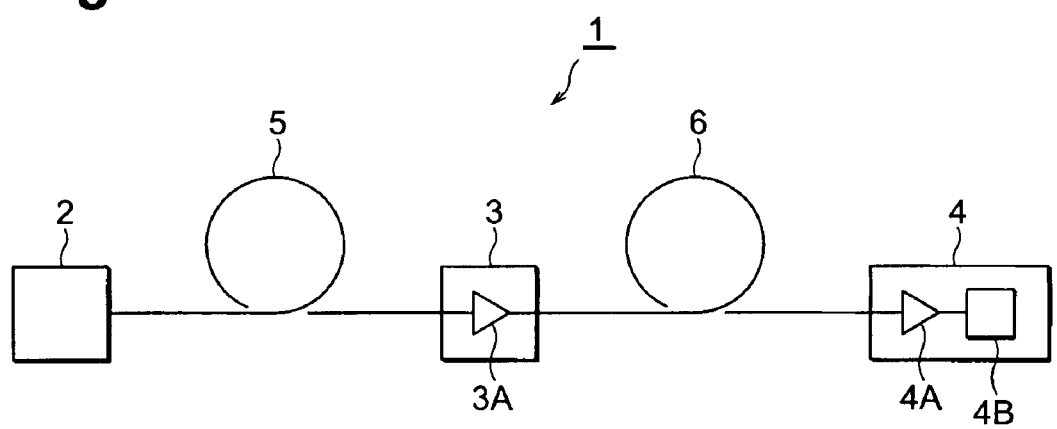
FIG. 1 is a view showing the arrangement of an embodiment of an optical transmission system according to the present invention.

An embodiment of each of an optical fiber for amplification, optical fiber amplifier, and an optical transmission system according to the present invention will be described in detail below with reference to FIGS. 1 and 2, FIGS. 3A and 3B, and FIGS. 4 to 7. Note that the same reference numerals denote the same parts throughout the drawings, and a repetitive description will be avoided.

FIG. 1 is a view showing the arrangement of an embodiment of the optical transmission system according to the present invention. An optical transmission system 1 includes a transmitter 2, repeater 3, and receiver 4. The transmitter 2 and repeater 3 are connected to each other through an optical fiber transmission line 5. The repeater 3 and receiver 4 are connected to each other through an optical fiber transmission line 6. The repeater 3 incorporates an optical fiber amplifier 3A. The receiver 4 incorporates an optical fiber amplifier 4A and receiving device 4B. The optical transmission system 1 is a system suitable for transmitting signals belonging to the L-band. The optical fiber amplifiers 3A and 4A collectively amplify signals in the respective channels in the L-band.

A signal belonging to the L-band which is sent out from the transmitter 2 propagates through the optical fiber transmission line 5 and reaches the repeater 3. In the repeater 3, the optical fiber amplifier 3A amplifies the incoming signal. The signal belonging to the L-band which is sent out from the repeater 3 then propagates through the optical fiber transmission line 6 and reaches the receiver 4. In the receiver 4 as well, the optical fiber amplifier 4A amplifies the signal belonging to the L-band, and the receiving device 4B receives the amplified signal.

Figure 2:
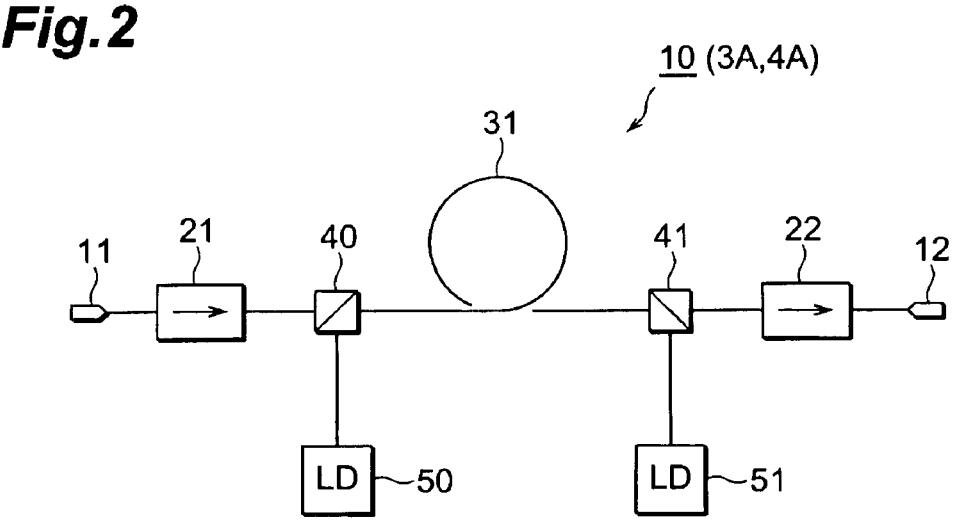
FIG. 2 is a view showing the arrangement according to an embodiment of an optical fiber amplifier according to the present invention.

FIG. 2 is a view showing the arrangement of an embodiment of the optical fiber amplifier according to the present invention, which corresponds to the optical fiber amplifiers 3A and 4A shown in FIG. 1. An optical fiber amplifier 10 has an optical isolator 21, optical coupler 40, optical fiber for amplification 31, optical coupler 41, and optical isolator 22 sequentially arranged from an input terminal 11 to an output terminal 12 in the order named. A pumping light source 50 is connected to the optical coupler 40. A pumping light source 51 is connected to the optical coupler 41.

The optical isolator 21 passes light in the forward direction from the input terminal 11 to the optical coupler 40 but passes no light in the reverse direction. The optical isolator 22 passes light in the forward direction from the optical coupler 41 to the output terminal 12 but passes no light in the reverse direction. The optical fiber for amplification 31 is a silica-based optical fiber having a core region doped with Er element and Al element. When pumping light (wavelength of 1.48 μm) is supplied to the optical fiber for amplification 31, a signal in each channel in the L-band is amplified. The optical coupler 40 outputs the pumping light arriving from the pumping light source 50 to the optical fiber for amplification 31, and outputs the signal arriving from the optical isolator 21 to the optical fiber for amplification 31. The optical coupler 41 outputs the pumping light arriving from the pumping light source 51 to the optical fiber for amplification 31, and outputs the signal arriving from the optical fiber for amplification 31 to the optical isolator 22. Each of the pumping light sources 50 and 51 is, for example, a semiconductor laser source, which outputs pumping light having a wavelength that can pumps Er added in the optical fiber for amplification 31.

In the optical fiber amplifier 10, the pumping light output from the pumping light source 50 is supplied to the optical fiber for amplification 31 in the forward direction through the optical coupler 40. The pumping light output from the pumping light source 51 is supplied to the optical fiber for amplification 31 in the reverse direction through the optical coupler 41. A signal in each channel in the L-band which is input from the input terminal 11 passes through the optical isolator 21 and optical coupler 40 to be incident on the optical fiber for amplification 31. This signal is then amplified by the optical fiber for amplification 31. The amplified signal is output from the output terminal 12 through the optical coupler 41 and optical isolator 22.

Figure 3A:
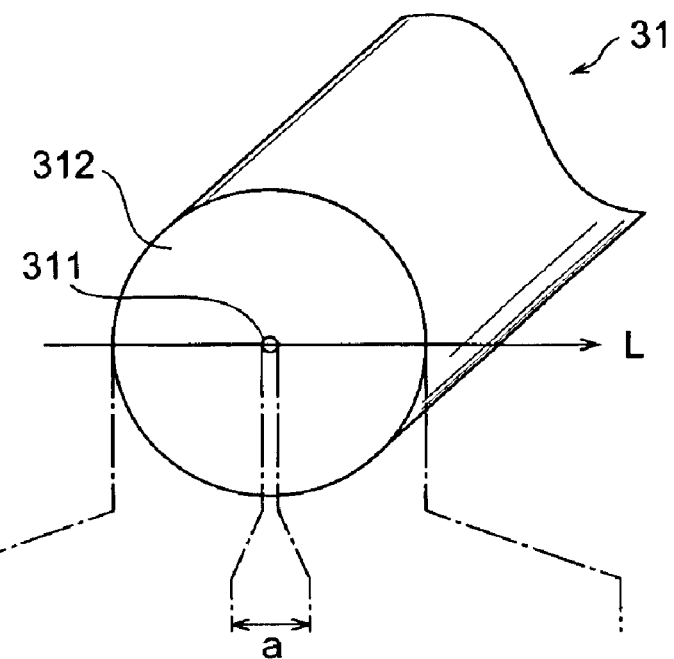
FIG. 3A is a view showing the cross-sectional structure of an embodiment of an optical fiber for amplification according to the present invention.

FIG. 3A is a view showing an example of the cross-sectional structure of the optical fiber for amplification 31.

Figure 3B:
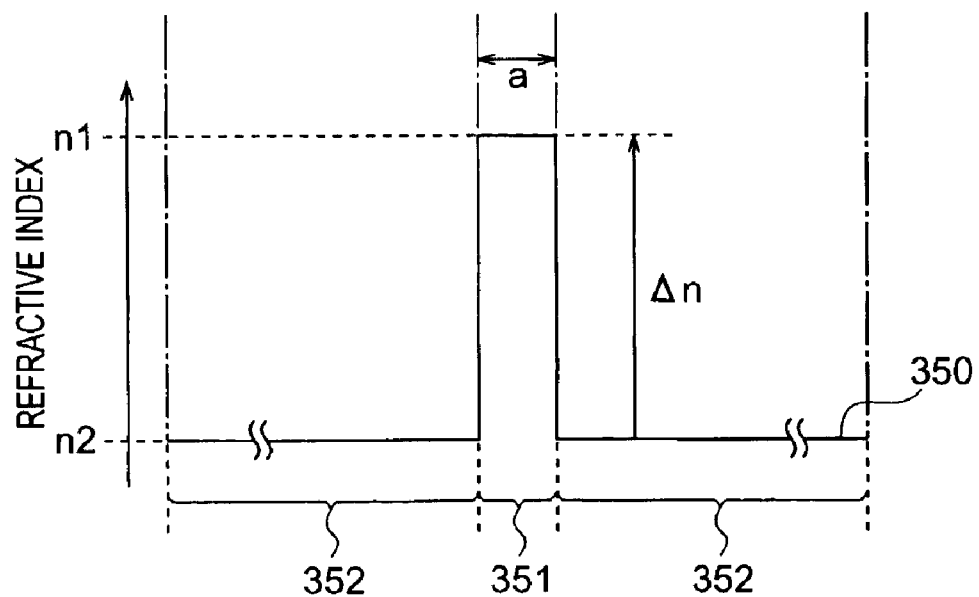
FIG. 3B is a refractive index profile of the optical fiber for amplification.

As shown in FIG. 3A, the optical fiber for amplification 31 includes a core region 311 which extends along a predetermined axis and has a refractive index n1 and a diameter a, and a cladding region 312 which is formed around the core region 311 and has a refractive index n2 (<n1). FIG. 3B shows the refractive index profile of the optical fiber for amplification 31 shown in FIG. 2A. A refractive index profile 350 indicates the refractive index of each portion on a line L (a straight line perpendicular to the optical axis of the optical fiber for amplification 31) in FIG. 3A, a region 351 indicates the refractive index of a portion of the core region 311 which is located on the line L, and a region 352 represents the refractive index of a portion of the cladding region 312 which is located on the line L.

A relative refractive index difference Δn between the refractive index n1 of the core region 311 and the refractive index n2 of the cladding region 312 is given by $$\Delta n = ((n1)^2 - (n2)^2)/2(n1)^2 \quad (1)$$

The cross-sectional structure and refractive index profile shown in FIGS. 3A and 3B are representative examples for realizing the optical fiber for amplification 31 according to the present invention and can be variously modified. As refractive index profiles that can be applied to the optical fiber for amplification 31, for example, refractive index profiles like those shown in FIGS. 7 to 9 in U.S. Pat. No. 5,838,867. These refractive index profiles include a refractive index profile obtained when the core region 311 is formed from a single glass layer and a refractive index profile obtained when the core region is formed from a plurality of glass layers having different refractive indexes. In any case, the core region 311 need not be entirely doped with a rare-earth element and may be at least partly doped with a rare-earth element.

The optical fiber for amplification 31 according to the present invention, in particular, has an Er concentration of 1,500 wt.ppm or less, an absorption loss $\alpha_{1.53}$ of 10 dB/m or more but 25 dB/m or less at a wavelength of 1.54 μm, and an unsaturated absorption of 900 dB or less. This allows to decrease the length of the optical fiber for amplification 31 (to, for example, 100 m or less), which is desirable in making the optical fiber amplifier 10 more compact. In addition, this can suppress a deterioration in waveform due to polarization mode dispersion or a nonlinear optical phenomenon. Furthermore, the influence of concentration quenching can be reduced to improve the amplification efficiency of the optical fiber for amplification 31.

Note that the unsaturated absorption of the optical fiber for amplification 31 is given by the product (=absorption loss per unit length at wavelength of 1.53 μm×length) of an absorption amount per unit length at a wavelength of 1.53 μm in the loss spectrum (see Japanese Patent No. 2669976) and the length of the optical fiber.

The Er concentration (wt.ppm) in the core region 311 of the optical fiber for amplification 31 is derived from a saturation parameter to be described below. That is, an Er concentration Nt (m$^{-3}$) in the optical fiber for amplification 31 can be approximately derived from $$Nt = \zeta \cdot \tau/(\pi \cdot b^2) \quad (2)$$

where $\zeta$ is a saturation parameter (s$^{-1}$·m$^{-2}$), τ is the lifetime of fluorescence (ms), and b is the radius of a region doped with Er. In many cases, the saturation parameter $\zeta$ is obtained by actual measurement, and the lifetime τ of fluorescence is set to 10 ms as a representative. The doped region radius b is easily calculated from a cutoff wavelength and a mode field diameter at a wavelength of 1.55 μm. At this time, the Er concentration Nt (m$^{-3}$) is converted into an Er concentration Ns (wt.ppm) according to $$Ns\ (wt.ppm) = Nt\ (m^{-3}) \cdot Z/(D \cdot N) \quad (3)$$

where D is the concentration of glass (SiO$_2$) (=2.86 g/cm$^3$), Z is the mass of Er$^{3+}$ at 1 mol (=167.3 g), and N is the Avogadro's number (=6.02×10$^{23}$).

The optical fiber for amplification 31 preferably has a cutoff frequency of 1.2 μm or more but 1.5 μm or less at a length of 2 m. This can increase the absorption loss $\alpha_{1.53}$ without increasing the Er concentration. In addition, the optical fiber for amplification 31 preferably has a polarization mode dispersion of 0.5 ps or less in the L-band. This is because a deterioration in waveform can be suppressed, and high-speed optical transmission at a bit rate of 10 Gbps or more can be realized. Furthermore, the optical fiber for amplification 31 is preferably disposed in the form of a bundle or being wound around a bobbin when applied to the optical fiber amplifier 10. This is because it improves the ease of accommodating the optical fiber in the optical fiber amplifier 10 and handling the optical fiber.

A sample manufactured as the optical fiber for amplification 31 by way of trial will be described next. In this case, an EDF-A is an optical fiber for amplification as a comparative example, and each of EDF-B to EDF-E is a sample manufactured as the optical fiber for amplification 31 by way of trial. Note that FIG. 4 is a table providing a summary of specification data of the comparative example EDF-A and the sample EDF-B to EDF-E corresponding to the optical fiber for amplification 31.

The comparative example EDF-A has an Er concentration of 520 wt.ppm, an Al concentration of 3.5 wt %, an absorption loss $\alpha_{1.53}$ of 5.5 dB at a wavelength of 1.53 μm, a cutoff wavelength of 0.91 μm at a length of 2 m, a length of 142 m, an unsaturated absorption of 780 dB, and a polarization mode dispersion of 0.61 ps at a wavelength of 1.58 μm.

The sample EDF-B has an Er concentration of 780 wt.ppm, an Al concentration of 2.0 wt %, an absorption loss a 1.53 of 15.6 dB at a wavelength of 1.53 μm, a cutoff wavelength of 1.46 μm at a length of 2 m, a length of 50 m, an unsaturated absorption of 780 dB, and a polarization mode dispersion of 0.25 ps at a wavelength of 1.58 μm.

The sample EDF-C has an Er concentration of 970 wt.ppm, an Al concentration of 3.0 wt %, an absorption loss $\alpha_{1.53}$ of 18.8 dB at a wavelength of 1.53 μm, and a cutoff wavelength of 1.39 μm at a length of 2 m.

The sample EDF-D has an Er concentration of 850 wt.ppm, an Al concentration of 3.0 wt %, an absorption loss $\alpha_{1.53}$ of 16.0 dB at a wavelength of 1.53 μm, and a cutoff wavelength of 1.32 μm at a length of 2 m.

The sample EDF-E has an Er concentration of 1,080 wt.ppm, an Al concentration of 3.5 wt %, an absorption loss $\alpha_{1.53}$ of 20.0 dB at a wavelength of 1.53 μm, and a cutoff wavelength of 1.31 μm at a length of 2 m.

Figure 5:
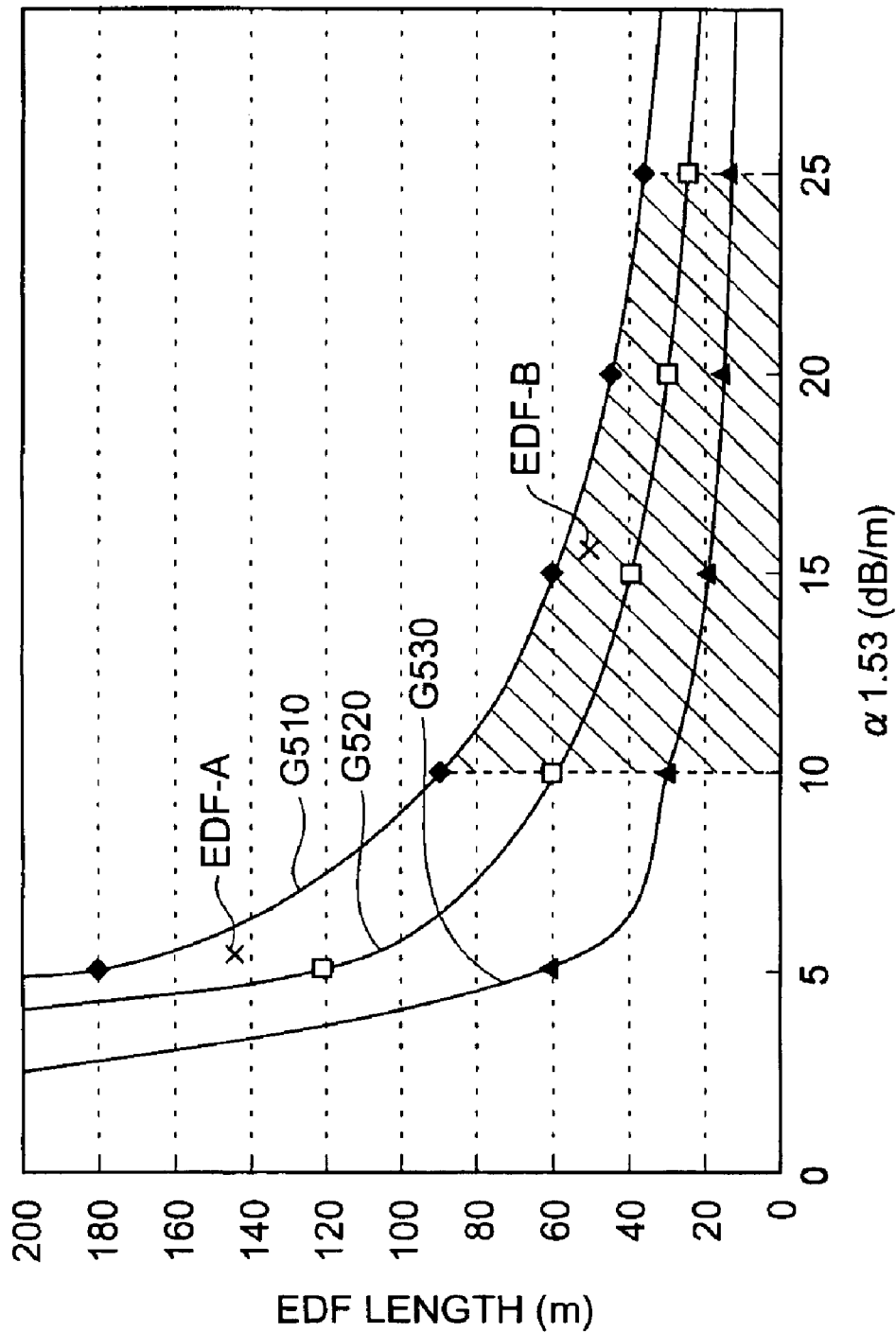
FIG. 5 is a graph showing the relationship between the absorption loss $\alpha_{1.53}$ and the length at a wavelength of 1.53 μm when the unsaturated absorption is changed.

FIG. 5 is a graph showing the relationship between the absorption loss $\alpha_{1.53}$ and the length of each of the optical fiber for amplifications 31 having unsaturated absorptions of 900 dB, 600 dB, and 300 dB. Referring to FIG. 5, a curve G510 represents the relationship between the absorption loss $\alpha_{1.53}$ and the length of the optical fiber for amplification having an unsaturated absorption of 900 dB, a curve G520 represents that of the optical fiber for amplification having an unsaturated absorption of 600 dB, and a curve G530 represents that of the optical fiber for amplification having an unsaturated absorption of 300 dB. Referring to FIG. 5, characteristics of the comparative example EDF-A and sample EDF-B are plotted, and the hatching area indicates a range in which the absorption loss $\alpha_{1.53}$ is 10 dB/m or more and 25 dB/or less, and the unsaturated absorption is 900 dB or less. As is obvious from FIG. 5, the comparative example EDF-A has a characteristic that falls outside the hatching area, but the sample EDF-B has a characteristic that falls within the hatching area.

Figure 6:
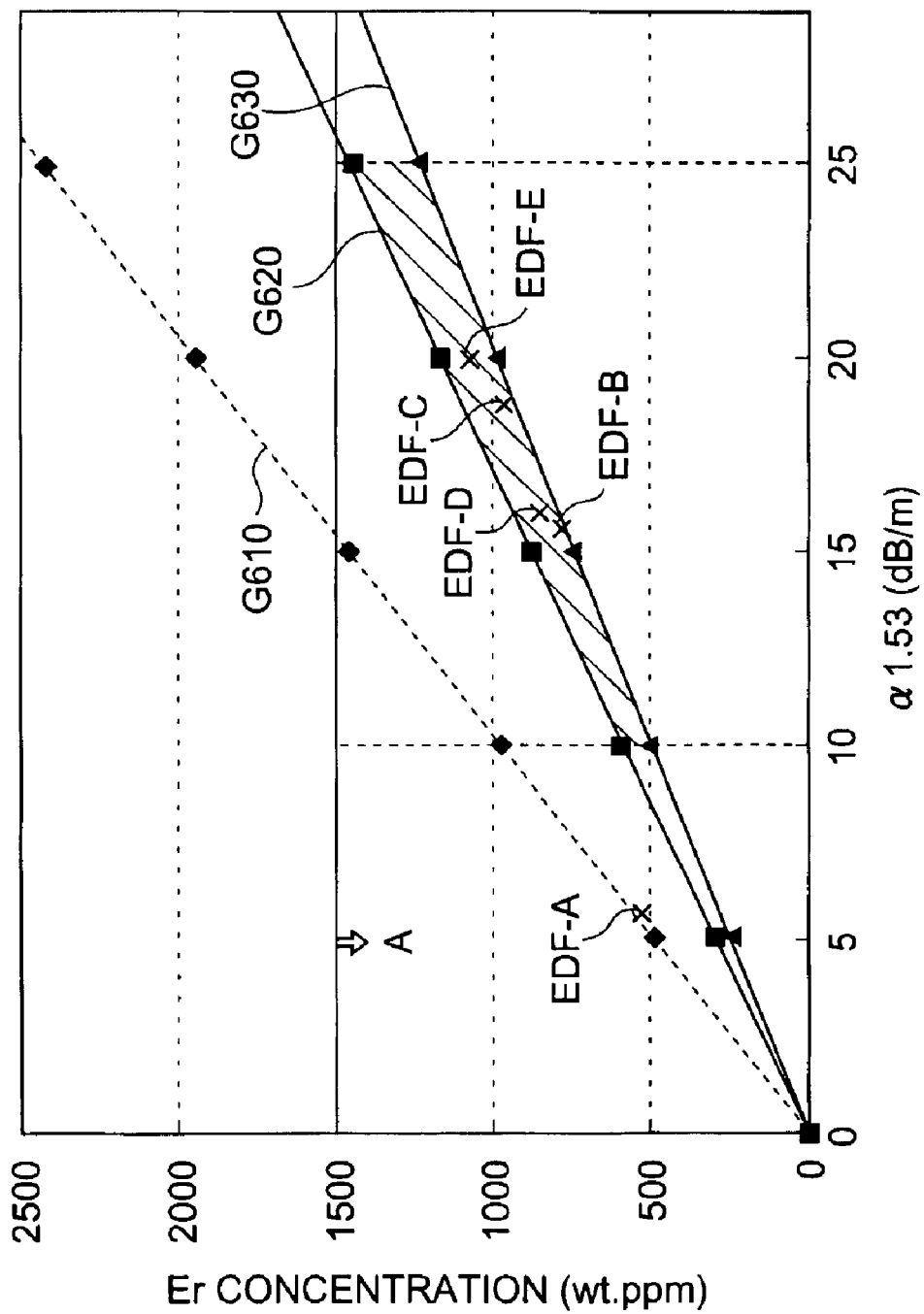
FIG. 6 is a graph showing the relationship between the absorption loss $\alpha_{1.53}$ and the Er concentration at a wavelength of 1.53 μm when the cutoff wavelength is changed.

FIG. 6 is a graph showing the relationship between the absorption loss a 1.53 and the Er concentration when the cutoff wavelength is changed. Referring to FIG. 6, a curve G610 represents the relationship between the absorption loss $\alpha_{1.53}$ and the Er concentration of the optical fiber for amplification having a cutoff wavelength of 0.9 μm, a curve G620 represents that of the optical fiber for amplification having a cutoff wavelength of 1.2 μm, and a curve G630 represents that of the optical fiber for amplification having a cutoff wavelength of 1.5 μm. Referring to FIG. 6, characteristics of the comparative example EDF-A and sample EDF-B to sample EDF-E are plotted, and the hatching area indicates a range in which the absorption loss $\alpha_{1.53}$ is 10 dB/m or more and 25 dB/m or less and the cutoff wavelength at a length of 2 m is 1.2 μm or more and 1.5 μm or less. In addition, referring to FIG. 6, the area indicted by an arrow A represents a concentration range in which a deterioration in amplification characteristic due to concentration quenching can be prevented. As is obvious from FIG. 6, the comparative example EDF-A has characteristics falling outside the hatching area, but each of the sample EDF-B to sample EDF-E has characteristics falling within the hatching area.

FIG. 7 is a graph showing the amplification characteristic of an optical fiber amplifier to which the comparative example EDF-A is applied and that of an optical fiber amplifier to which the sample EDF-B is applied. Referring to FIG. 7, reference symbol P710 denotes the amplification characteristic of the optical fiber amplifier to which the comparative example EDF-A is applied; and P720, the amplification characteristic of the optical fiber amplifier to which the sample EDF-B is applied.

The arrangement of each optical fiber amplifier prepared for measurement is the same as that of the optical fiber amplifier shown in FIG. 2. The pumping light source 50 for supplying pumping light in the forward direction had an output wavelength of 1,480 nm and an output power of 100 mW. The pumping light source 51 for supplying pumping light in the reverse direction also had an output wavelength of 1,480 nm and an output power of 100 mW. Signals input from the input terminal 11 were signals in four channels (1,570 nm, 1,580 nm, 1,590 nm, and 1,600 nm) belonging to the L-band, and the input power of a signal in each channel was 15 dBm.

As is obvious from FIG. 7, the optical fiber amplifier to which the sample EDF-B having a length ⅓ that of the comparative example EDF-A has a good amplification characteristic.

Note that the present invention is not limited to the above embodiment, and various modifications can be made. For example, an optical fiber amplifier may be designed such that a plurality of optical fiber for amplifications, each having the above structure, are connected to each other, and pumping light beams are respectively supplied to the plurality of optical fiber for amplifications.

It is apparent from the above description of the present invention that the present invention can be variously modified. It is to be understood that such modifications fall within the spirit and scope of the present invention, and any improvements apparent to those skilled in the art should be incorporated in the appended claims.

INDUSTRIAL APPLICABILITY

As has been described above, according to the present invention, the length of an optical fiber for amplification can be decreased, and a deterioration in waveform due to polarization mode dispersion or a nonlinear optical phenomenon can be effectively suppressed. The influence of concentration quenching is reduced, and the amplification efficiency is improved. An optical fiber amplifier to which such an optical fiber for amplification is applied can be reduced in size and has an excellent amplification characteristic, and hence is suitable for amplifying signals in the L-band. In addition, an optical transmission system including such an optical fiber amplifier allows high-speed, large-capacity optical transmission using signals in the respective channels in the L-band.

What is claimed is:

1. An optical fiber for amplification of a silica-based optical fiber having a core region doped with Er element and Al element,
    wherein an Er concentration is 1.500 wt.ppm or less, and
    wherein said optical fiber for amplification, at a wavelength of 1.53 μm, has the characteristics of:
    an absorption loss of 10 dB/m or more but 25 dB/m or less;
    an unsaturated absorption of 900 dB or less; and
    a polarization mode dispersion of 0.5 ps or less in an L-band defined as the wavelength range of 1,570 nm to 1,610 nm.

2. An optical fiber for amplification according to claim 1, further having a cutoff wavelength of 1.2 μm or more but 1.5 μm or less at a length of 2 m.

3. An optical fiber amplifier, comprising:
    an input terminal for receiving signals in each channel in an L-band defined as the wavelength range of 1,570 nm to 1,610 nm;
    an optical fiber for amplification according to claim 1 which amplifies the signals received through said input terminal when pumping light is supplied; and a pumping light source which supplies the pumping light to said optical fiber for amplification.

4. An optical transmission system including an optical fiber amplifier according to claim 3.

5. An optical fiber amplifier according to claim 3, wherein said optical fiber for amplification is disposed in the form of a bundle or being wound around a bobbin.

* * * * *